United States Patent [19]

Rozzell et al.

[11] 4,016,761

[45] Apr. 12, 1977

[54] OPTICAL TEMPERATURE PROBE

[75] Inventors: Thomas C. Rozzell, Annandale, Va.; Curtis Johnson, Sanda, Utah; Carl Durney; James Lords, both of Salt Lake City, Utah

[73] Assignee: The United States of America as represented by the Secretary of the Navy, Washington, D.C.

[22] Filed: Apr. 18, 1974

[21] Appl. No.: 461,834

[52] U.S. Cl. .............................. 73/356; 73/355 R
[51] Int. Cl.² .................... G01K 11/12; G01J 5/60
[58] Field of Search ............ 73/339 R, 356, 355 R, 73/355 EM; 356/44, 45

[56] References Cited

UNITED STATES PATENTS

| | | | |
|---|---|---|---|
| 3,533,399 | 10/1970 | Goldberg et al. | 73/356 X |
| 3,591,810 | 7/1971 | Jackson | 73/356 X |
| 3,651,695 | 3/1973 | Brown | 73/356 |
| 3,720,623 | 3/1973 | Cartmell et al. | 73/356 UX |
| 3,789,667 | 2/1974 | Porter et al. | 73/406 |

Primary Examiner—Richard C. Queisser
Assistant Examiner—John S. Appleman
Attorney, Agent, or Firm—R. Sciascia; R. Beers; S. Sheinbein

[57] ABSTRACT

A temperature probe measures temperature changes of biological tissue while the tissue is being irradiated with microwaves. The temperature probe is completely nonmetallic to minimize perturbation of the microwave field, and the structure of the probe includes a plurality of optic fibers which carry light to and from a reflective liquid crystal film. The liquid crystal is enclosed in a housing at the tip of the probe which is in contact with the biological tissue, and the liquid crystal undergoes changes in absolute reflectance proportional to the temperature changes of the tissue. The optic fibers are gathered in a bundle with a first portion of the bundle transmitting light from a light generation device to the liquid crystal and the remainder of the bundle transmitting reflected light from the crystal back to a photo transistor. The reflected light received by the photo transistor is converted into an electrical signal and displayed as a representation of temperature.

11 Claims, 4 Drawing Figures

OPTICAL TEMPERATURE PROBE

BACKGROUND OF THE INVENTION

The present invention relates, generally, to the field of temperature measurement and, more particularly, to a temperature probe which enables accurate reading of electromagnetic power deposition and temperature changes of irradiated biological tissue.

A conventional method of measuring internal temperature of biological tissue involves metallic sensors, such as thermistors and thermometers. Another known method of temperature measurement involves calorimetric techniques. However, each of these methods has been found deficient when used to measure temperature changes of biological tissue in the presence of electromagnetic field. For example, metallic sensors have the effect of concentrating electromagnetic field and producing undesirable localized hot spots in the biological tissue. Calorimetric methods require that the tissue be completely enclosed in some type of container while further restricting the temperature measurements until after irradiation of the material.

Research of biological tissue has been greatly restricted by the unavailability of a probe which does not perturb the electromagnetic field. Efforts to solve this problem have resulted in the use of more complex apparatus and techniques such as thermographic camera photographs of phantom modeling material, quick placement of metallic therometers, and other measurement techniques. Limitations of these methods include restricted accuracy of the measurement, limited accessability to the required measuring sites, as well as the inability of these techniques to take measurements during exposure of the tissue to radiation.

SUMMARY OF THE INVENTION

An object of the present invention is to provide an improved temperature probe which measures temperature differences in bilogical tissues.

Another object of the invention is to provide an optical temperature probe which is capable of measuring temperature differences in biological tissue during the exposure of the tissue to microwave radiation without perturbing the microwave field.

Briefly, the present invention accomplishes these objects by using a fiberoptic-liquid crystal probe which is purely dielectric. Since no electrical conducting material is used no electric field concentration is produced. In the probe of the invention a fiber optic bundle is used which consists of a number of optic fibers which conduct light from an optics module to the liquid crystal, and a similar number of optic fibers which transmit reflected light from the liquid crystal back to the optics module. The liquid crystal is housed within the probe tip which is adapted to be installed within the biological tissue, and any change in the temperature of the tissue causes a corresponding change in the light signal being reflected by the crystal. The change generally takes the form of a spectral shift and/or change in scattering amplitude. Reflected light is transmitted by the optic fibers to a phototransistor where it is converted to an electrical signal and displayed as a representation of temperature.

BRIEF DESCRIPTION OF THE DRAWINGS

Other objects, advantages and novel features of the present invention will become apparent from the following detailed description of the invention when considered in conjunction with the accompanying drawings, in which.

DETAILED DESCRIPTION

Figure 1:
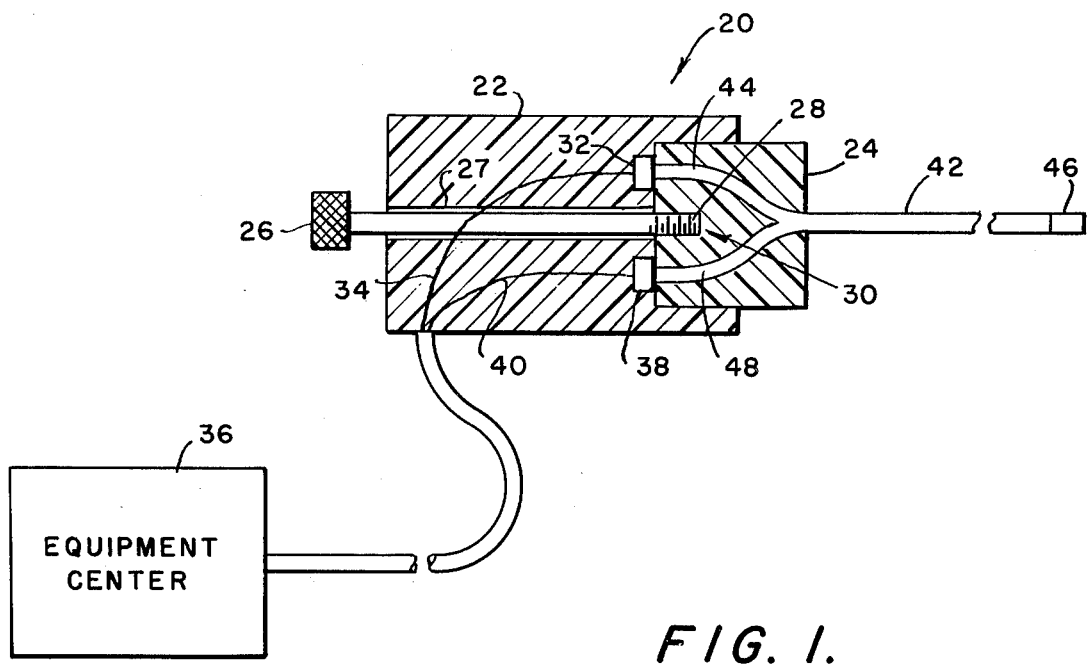
FIG. 1 is a schematic representation of an ambodiment of the invention.

In FIG. 1, there is shown a component housing 20 which includes an optics module section 22 and a probe connector section 24. The housing can be constructed of solid plastic or any other non-metallic material and is formed in two sections to facilitate changing of defective components which may occur during extended use of the probe. It may be desirable to change the sources of light contained within optics module 22. The formation of the housing into two sections will assist this operation. The optics module 22 and probe connector 24 are joined together by a screw connector 26 which passes through a bore 27 in optics module 22. The screw connector 26 has a threaded end portion 28 which engages corresponding threads 30 formed in the probe connector section 24 of the housing 20. Connector 26 is shown for purposes of illustration only and other types of connectors may be used to connect the two sections together.

Within the optics module 22 is red light emitting diode (LED) 32 which is connected via conductor 34 to an electrical supply contained in equipment center 36. The LED is commercially obtained and, for example may be of 0.685 micron red gallium-arsenide-phosphide LED. Although a red light emitting diode is discussed, a green LED may be substituted in order to change the temperature range of the liquid crystal. The temperature range changes upon substitution of the illuminating source because the liquid crystal material appears green when cool and turns red as it warms, and a green source of illumination provides a smaller output variance as a function of temperature when compared with a red light source. Module 22 also includes a photodiode or phototransistor 38 which produces an electrical output on line 40 in proportion to the intensity of any light it detects. The output on line 40 is also conducted back to the equipment center 36 for further processing and eventually displayed as a representation of temperature.

The probe connector section 24 includes a fiber optic bundle 42 having a first group of optic fibers 44 which receives light from light emitting diode 32 and transmits it to the tip 46 containing the liquid crystal. A second group of optic fibers 48 receives light reflected at the tip 46 and transmits it to phototransistor 38. The optic fibers 44 and 48 are well known in the art and each fiber may, for example, be formed of 0.005 inch diameter clad plastic.

Figure 2:
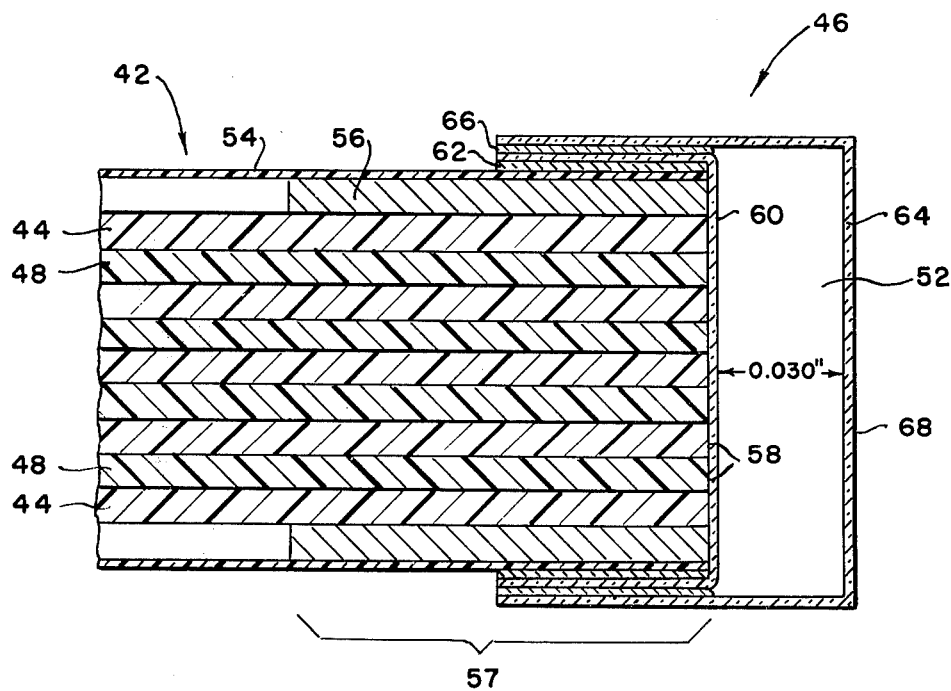
FIG. 2 is an enlarged cross-sectional view of the slender tip of the fiber optic bundle which is implanted in the biological tissue being measured.

The tip region 46 of the probe is disclosed more clearly in FIG. 2 wherein the optic bundle 42 is shown adjacent to the liquid crystal 52. The liquid crystal mixture 52 may consist of cholesteryl pelargonate, cholesteryl oleyl carbonate, and cholesteryl chloride, which gives a large response in the 30°–45° C range and is suitable for many biological applications. The specific fractions of each of these compounds required for optimum response depends on the sensor tip configuration, light illumination wavelength and crystal purity. For purposes of the description, the optic bundle 42 is shown symmetrically composed of optic fibers 44 conducting the incident light, and optic fibers 48 which conduct the reflected light. However it will be understood that the symmetrical spacing shown in FIG. 2 generally does not result. Protecting the optic bundle 42 is a polyvinyl chloride sheath 54 which forms a water tight shield. A bonding sealing material 56, which may be epoxy, is used to firmly bond together a section 57 of the optic bundle 42 which is adjacent to the liquid crystal 52. The end 58 of the optic bundle 52 is a highly polished surface which is bonded to a inner glass cover 60 by means of a sealing layer of epoxy 62. The liquid crystal 52 is enclosed between the inner glass cover 60 and an outer glass cover 64, the latter also being bonded to the optic bundle by means of an epoxy seal layer 66. It is important that each of seals shown are airtight since air is known to age the liquid crystal. Generally, the tip 46 will be implanted sufficiently far into the tissue being examined so that stray light neither enters nor leaves the chamber formed between inner glass cover 60 and outer glass cover 64. However, as additional protection an opaque coating 68 may be included on the outer glass cover 64 to prevent stray light from interfering with the reflected light signal. Due to the inherent properties of the optic fibers 44 and 48, light will not be lost out the sides of the optic fibers or be transmitted from one optic fiber to another contiguous fiber.

Figure 3:
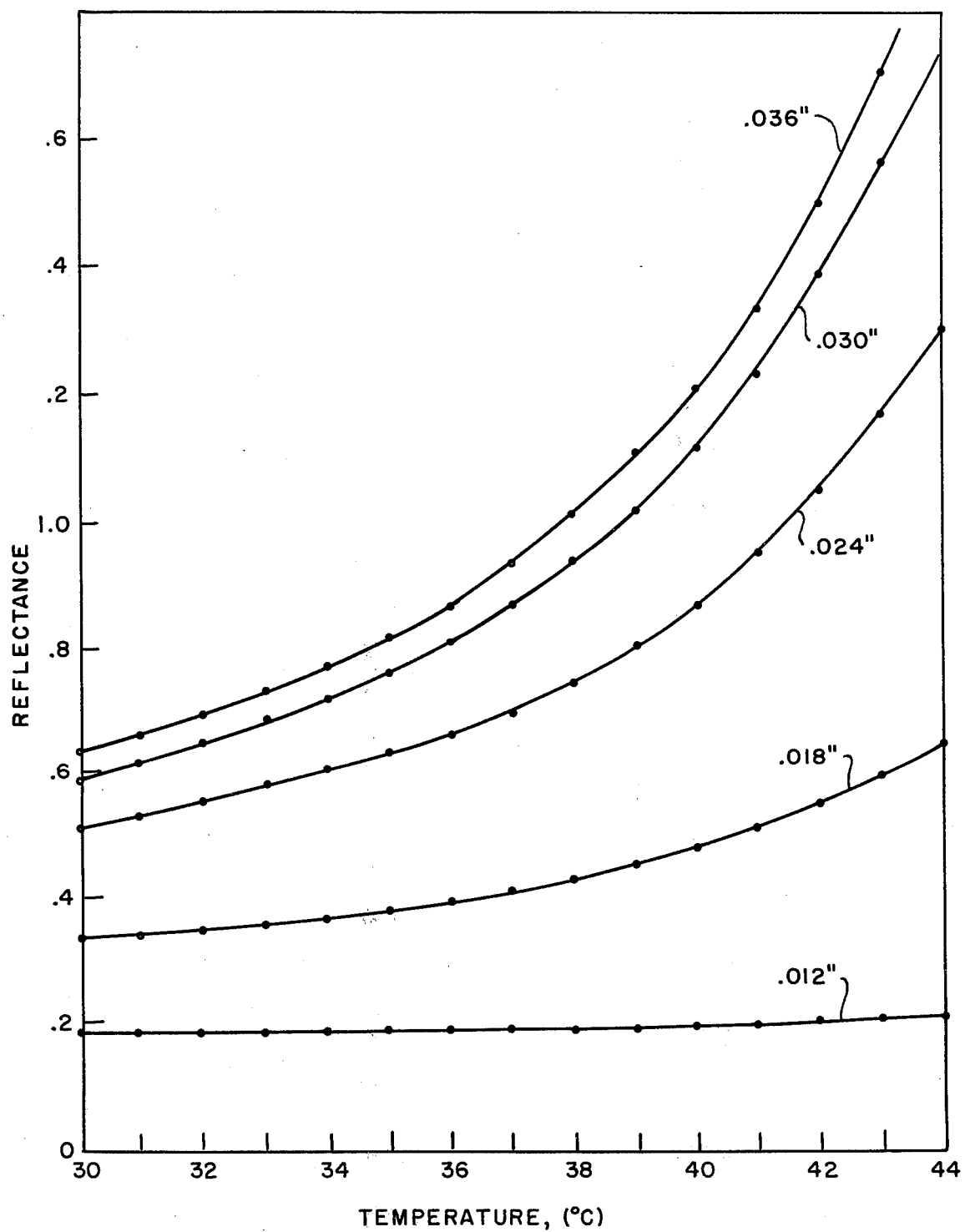
FIG. 3 is a graphical representation of the red reflectance vs temperature for several different thickness of liquid crystal.

It has been established that a thin film of liquid crystal having a thickness of approximately 0.030 inch as shown in FIG. 2 performed well over a selected temperature range. Temperature response curves for different thicknesses of the liquid crystal are shown in FIG. 3, indicating the need for crystal material spaced 0.030 inch for maximum sensitivity (maximum slope or $dR/dT$) in the temperature range selected. At higher temperatures the liquid crystal "clears" and light scattering capacity diminishes. Clearing should be avoided, as it results in a disorientation of the molecular stacks responsible for light scattering, and reorientation may result in decalibration of the probe. The curve shown in FIG. 3 represents the reflectance characteristics using red light. The optimum scattering response occurs in the 25°–35° range for room applications and in the 35°–45° range for animal testing. However results depend on the specific type of liquid crystal used.

Figure 4:
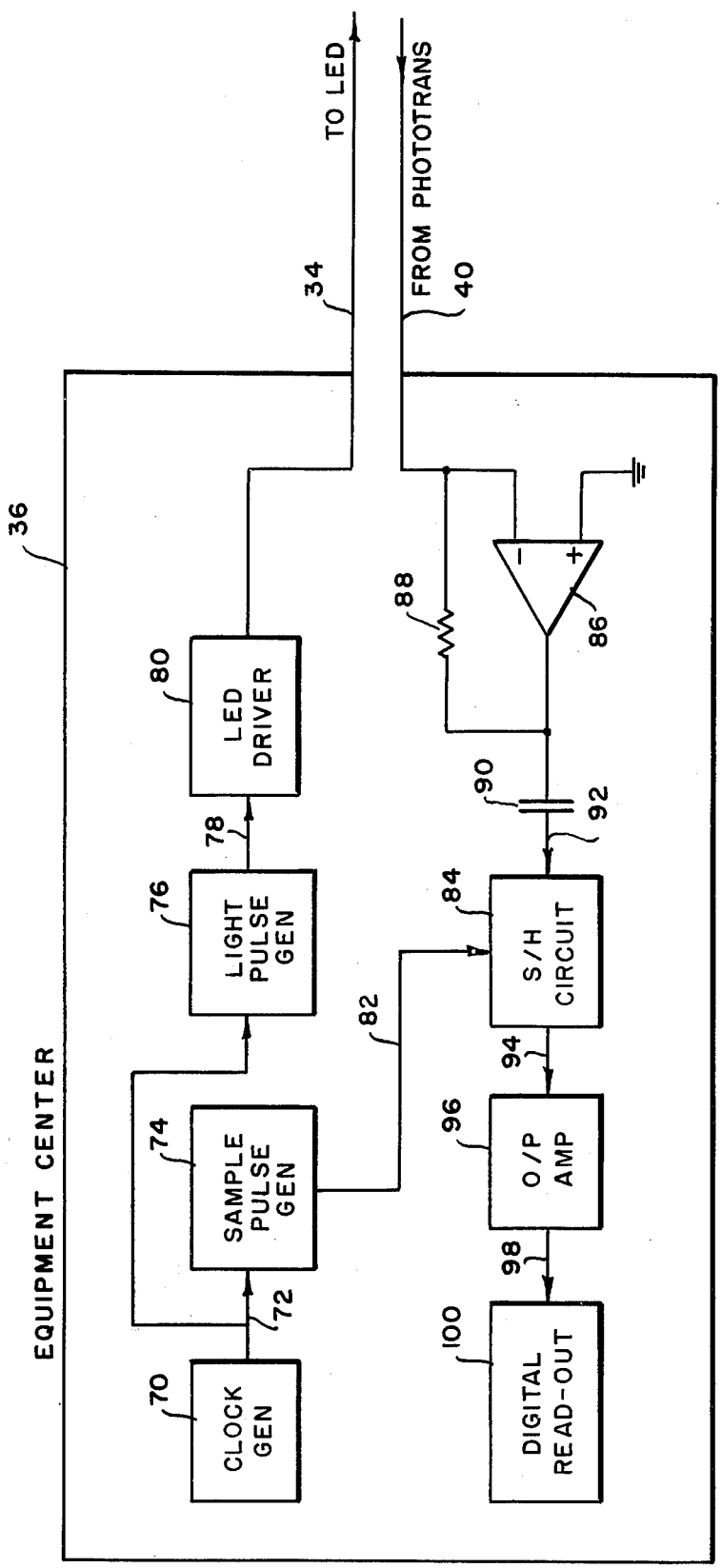
FIG. 4 is a schematic diagram of the electronic circuitry which may be used in the equipment center of FIG. 1.

Turning now to FIG. 4, an electrical circuit is diagrammatically shown which can be used as equipment center 36. Center 36 includes a clock generator 70 which produces a series of clock pulses on output line 72. The clock pulses are fed to a sample pulse generator 74 and a light pulse generator 76. Output 78 of light pulse generator 76 is conducted to a driver circuit 80 which drives LED 32. Output 82 from sample pulse generators 74 is fed to a sample and hold circuit 84 where is held for comparison with incoming signals on line 40 from phototransistor 38. The incoming signals are first conducted to an amplifier circuit consisting of amplifier 86 and associated resistor 88. After reduction of any transients by capacitor 90 the signal on line 92 is compared by circuit 84 to the sample pulse on line 82 and any resulting error signal is conducted via line 94 to operational amplifier 96. Operational amplifier 96 converts the signal into usable data and feeds it via line 98 to a digital circuit 100 where a temperature reading is displayed.

Examining the operation of the circuit in conjunction with the temperature probe, clock pulse generator 70 (FIG. 4) sets the frequency of the pulse and feeds it via line 72 to light pulse generators 76 where it is further shaped and conducted via line 78 to the LED driver 80. The driver output on line 34 in the form of a pulse is conducted to LED 32 (FIG. 1) which generates a light of known amplitude and phase. The light signal is conducted through optic fibers 44, within bundle 42, to the tip 46. This light is directed toward liquid crystal 52, having known characteristics, and reflected back to optic fibers 48 (FIG. 2). Since the absolute reflectance of the liquid crystal 52 will change in proportion to the temperature, the amount of reflected light conducted by optic fibers 48 is also porportional to temperature. The light is further conducted by optic fibers 48 to transistor 38 where it is converted into an electric signal and fed via line 40 to amplifier 86 (FIG. 4). After the signal is amplified it is compared to the transmitted signal by the sample and hold circuit 84 and an error signal is transmitted by way of line 94 to operational amplifier 96. By knowing the parameters of the transmitted pulse and the characteristics of the liquid crystal, the operational amplifier can convert the error signal into a representation of temperature and conduct it via line 98 to a digital readout and display 100.

Thus there has been described a temperature probe which permits measurement of temperature differences in biological tissue during exposure of the tissue to microwaves. The probe permits accurate readings of the temperature of biological tissue, an art which has until now been severely restricted by the use of temperature measurement devices which perturbed and disrupted the microwave fields.

Obviously, many modifications and variations of the present invention are possible in light of the above teachings. It is therefore to be understood that, within the scope of the appended claims, the invention may be practiced otherwise than as specifically described.

What is claimed is:

1. A temperature probe which is adapted to be implanted in a material whose temperature is to be measured comprising:
    an optic fiber bundle having first and second groups of optic fibers which are physically separated at one end of said bundle;
    a temperature sensitive element adapted to be implanted in said material to be measured and in close proximity to the other end of said bundle;
    means for maintaining said element in an airtight relationship to said other end of said bundle, said element having light reflective properties which are responsive to temperature changes; and
    light source adjacent to said first group of optic fibers at said one end of said bundle, and a light responsive element adjacent the second group of optic fibers at said one end of said bundle.

2. A temperature probe as defined in claim 1 wherein said temperature sensitive element is a liquid crystal film.

3. A temperature probe as defined in claim 2 wherein said liquid crystal film is a mixture of cholesteryl pelangonate, cholesteryl oleyl carbonate, and cholesteryl chloride.

4. A temperature probe as defined in claim 1 wherein said light source is a red gallium arsenide phosphide light emitting diode.

5. A temperature probe as defined in claim 1 wherein said light source is a green light emitting diode.

6. A temperature probe as defined in claim 1 wherein said temperature sensitive element is a film of liquid crystal mixture sealed in an opaque capsule.

7. A temperature probe for use with light-generating means comprising:
   an optic fiber bundle having first and second groups of optical fibers, said first group of optic fibers conducting light from light-generating means to a specimen;
   temperature-sensitive means, having specific internal light-reflectance characteristics, in contact with the end of the fiber optic bundle near said specimen, said temperature-sensitive means being responsive to temperature changes of said specimen whereby said internal light-reflectance characteristics are varied in proportion to said temperature changes; and
   light-responsive means responsive to the intensity of light impinging thereon, said second group of optic fibers receiving light internally reflected by scattering from the material comprising said temperature-sensitive means and conducting it to said light-responsive means, said light-responsive means converting said light into an electrical signal proportional to the intensity of the light reflected thereon from said temperature-sensitive means;
   wherein said temperature sensitive means is a liquid crystal material.

8. A temperature probe capable of being implanted in a specimen whose temperature is to be measured comprising:
   an optic fiber bundle having first and second groups of optic fibers which are physically separated at one end of said bundle and intermingled at the other end of said bundle;
   a temperature sensitive element in contact with said specimen and in close proximity to said other end of said bundle, said element having light reflective properties responsive to temperature changes;
   means for maintaining said element in an air-tight relationship to said other end of said bundle; and
   light source adjacent to said first group of optic fibers at said one end of said bundle, and a light responsive means adjacent said second group of optic fibers at said one end of said bundle.

9. The temperature of claim 8 wherein said probe further includes a housing, said housing having a first section for supporting said light source and said light responsive means, and a second section detachable from said first section for supporting said first and second groups of optic fibers adjacent said light source and said light responsive means respectively.

10. The temperature probe of claim 9 wherein said housing further includes a means for securing said first section to said second section.

11. A temperature probe for directly engaging a material whose temperature is to be measured comprising:
    a slender optic fiber bundle having first and second groups of optic fibers physically separated at one end of said bundle;
    a temperature sensitive element adapted to directly engage the material to be measured in close proximity to the other end of said bundle, said element having light reflective properties which are responsive to temperature changes;
    means for maintaining said element in an air-tight relation to said other end of said bundle;
    a light source contacting said first group of optic fibers at said one end of said bundle; and
    light responsive means contacting the second group of optic fibers at said one end of said bundle.

* * * * *